July 20, 1965
W. A. HILL
3,195,634
FRACTURING PROCESS
Filed Aug. 9, 1962
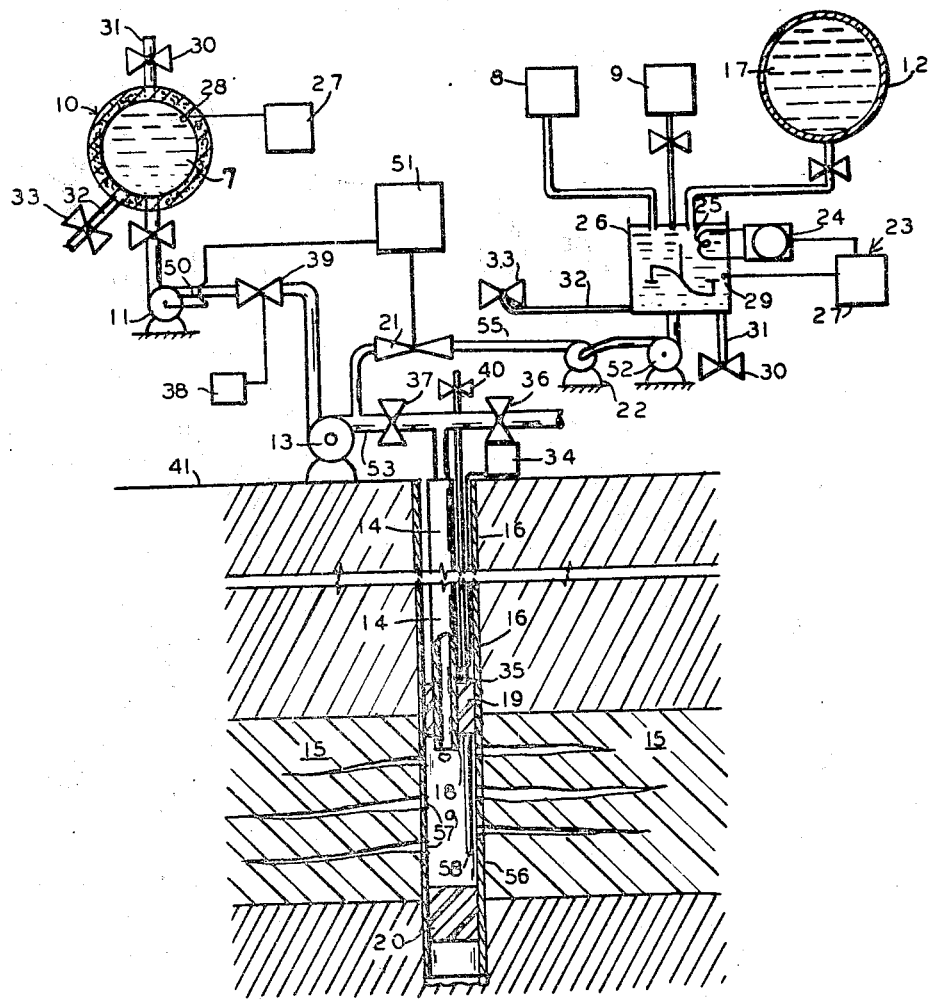
W. A. HILL
INVENTOR.
BY *Ely Silverman*
ATTORNEY 3,195,634
FRACTURING PROCESS
William Armistead Hill, 517 Roosevelt St., Borger, Tex.
Filed Aug. 9, 1962, Ser. No. 215,829
2 Claims. (Cl. 166—42)

This invention relates to an improvement in fracturing processes for treating earth formations containing oil or gas deposits.

One object of this invention is to provide an improved process for treating oil and gas wells.

Other objects will become apparent to those skilled in the art from a study of the below specification of which the drawings attached hereto form a part and wherein the appended figure is a diagrammatic showing of the apparatus used in the process of the invention.

Generally, the invention comprises the use of a particular composition comprising liquid carbon dioxide and an aqueous fluid as a fracturing fluid which is injected as a liquid—or liquid suspension when propping agents are used—into the formation to be treated until maximum penetration has been achieved. Pressure at the well head is maintained until the desired action of the treating fluid in the formation has occurred. Thereafter, the well head pressure is relieved: the liquids previously injected into the formation according to this invention flow back into the well and carbon dioxide gas is liberated in the formation as well as suspended in the aqueous fluid in the form of bubbles. The bubbles pick up residual oil and other matter as said bubbles are carried back into the well by the inflowing current of the water. Also, the liberated gas creates a gas lift to discharge the fracture fluid from the formation and return the fracturing fluid to the surface and so not only provides an effective fracturing action but also serves to clean out the formation.

The process is an improvement over U.S. Patent 1,658,305 in that the amount of carbon dioxide used herein is such as to particularly effectively discharge the fracturing fluid and the formation debris carried thereby while the use of liquid carbon dioxide—controlled in ratios as hereinbelow described—provides particularly useful chemical and physical actions.

More particularly referring now to the figure, liquid carbon dioxide, 7, is fed from the insulated pressure container, 10, at 250 to 300 pounds per square inch guage pressure and 0° F. to the first booster pump 11. Booster pump 11 raises the pressure an additional 50 to 100 pounds, and admixes that liquid with the aqueous fracturing liquid, 17, at the outlet 53 of the fracturing pump 13. Pump 13 is connected to a tubing or pipe 14 in well 16 that is in communication with an oil and/or gas formation, 15. The section 18 of the tubing or pipe 14 adjacent the formation 15 is open to formation 15 and sealed off from the remainder of the well by conventional removable packers as 19 and 20 or other sealing means and the casing 56 of well 16 is perforated, as shown at 57, for communication of pump 13 with the formation 15. Additional piping as 58 valved as at 40 at the surface also may communicate with formation 15 from the well surface 41.

The liquid carbon dioxide is added to the fracturing liquid 17 from tank 12 in an amount dependent upon the fluid injection rate so as to subsequently provide a substantially complete and economically rapid discharge of the fracturing liquid from the well. For this purpose, the amount of liquid $CO_2$ for the needed $CO_2$ gas-fluid ratio in the fluid-gas mixture in the tubing or pipe 14 on discharge is such as will provide 400 standard cubic feet of carbon dioxide per barrel (42 U.S. gallons per barrel) of fracturing fluid when operating at a formation depth of 3,000 feet with discharge pipes, as 14, of 4 to 7 inches internal diameter and usual formation temperatures. The amount of liquid $CO_2$ needed therefor is calculated on the basis of 75 standard cubic feet (at 14.7 p.s.i.a. and 80° F.) of carbon dioxide per U.S. gallon of liquid carbon dioxide at 250 to 300 p.s.i.a. pressure and 0° F. At lesser formation depths the usual operating range with conventional pipe sizes—e.g. 4" I.D. pipe—is from 300 standard cubic feet of carbon dioxide per barrel and at greater depths, as at 8,000 feet depth of formation, the gas-fluid ratio would be 700 standard cubic feet of carbon dioxide per barrel and, at 12,000 feet, 1,500 standard cubic feet of carbon dioxide per barrel. Usually and preferably this gas-fluid ratio should be checked and controlled to provide in pipe 14 on the discharge of fracturing fluid and $CO_2$ gas therefrom an integrated average density $\bar{p}$ no greater than that which corresponds to the value of $\bar{p}$ obtained by the equation:

$$\bar{p} = 144 \frac{\Delta p}{\Delta H} - \frac{fQ^2M^2}{7.413 \times \bar{p} \times D^5 \times 10^{10}}$$

this equation is derived from the modified Poettman and Carpenter equation (Drilling and Production, American Petroleum Institute, 1952, page 257), for calculation of pressure gradients in high rate flowing wells, which equation for use in this process reads as follows:

(A) $\qquad 144 \frac{\Delta p}{\Delta H} = \bar{p} + \frac{fQ^2M^2}{7.413 \times \bar{p} \times D^5 \times 10^{10}}$ where $\Delta p$ = pressure difference (in p.s.i.) between any two points in the vertical conduit,
$\Delta h$ = difference in height (in ft.) between the two points.
$\bar{p}$ = integrated average density (in lb./cu. ft.) of the two-phase mixture between the two points,
$Q$ = fluid flow rate (in STB of fluid/$D$),
$M$ = total mass (in lb. of the gas and fluid associated with 1 bbl. of fractionating fluid)
$D$ = inside diameter (in ft.) of the pipe, and
$f$ = dimensionless factor used as the correlating function for total energy loss due to irreversibilities of the fluid in flow.

The amount of liquid carbon dioxide to be used is calculated in this formula (A) on its volume when converted to gas at 14.7 p.s.i.a. and 32° F. This equation is modified to use, for the value of "$f$" the values expressed on page 1026, Journal of Petroleum Technology of October, 1961 and summarized in Table I herebelow. Also, in this process $\Delta p$ corresponds to the difference between the formation flowing pressure and the desired flowing pressure at valve 36, the surface flowing pressure.

Table I

[Energy loss factor ($f$) for use in Equation A]

| $\frac{QM}{D} \times 10^{-6}$ | $f$ |
|---|---|
| 0.3 | 0.8 |
| 0.5 | 0.15 |
| 1.0 | 0.03 |
| 2.0 | 0.01 |
| 3.0 | 0.006 |
| 4.5 | 0.0055 |
| 6.0 | 0.005 |

Alternatively, the minimum gas-oil ratio may also be determined by the graphical method given at page 1032–1033 of the Journal of Petroleum Technology, October, 1961.

According to such calculations the minimum ratio of liquid carbon dioxide per barrel of fracturing liquid 17 is determined for the value of $\bar{p}$ needed for gas lift discharge of the well. Such amount of liquid carbon dioxide is controlled by metering of the discharge from the first pump 11 to the second pump 13 for injection into the formation 15 as a fracturing composition comprising a liquid-liquid mixture of liquid carbon dioxide and conventional fracturing fluid with finely divided solid propping agent suspended therein.

The pressure and temperature conditions of operation of pumping the fracturing composition according to this invention are such as to maintain the carbon dioxide in its liquid state during its injection into the formation. The range of conditions of temperature and pressure for maintaining carbon dioxide in its liquid form are well known—e.g. Industrial and Engineering Chemistry, vol. 38, No. 2, 19, and Carbon Dioxide by Quinn and Jones (A.C.S. monograph No. 72) Reinhold Publishing Corp., N.Y., 1938, page 78. In the preferred embodiment the addition of the liquid carbon dioxide to the conventional fracturing liquid in the proportions as above and below described is effected by the apparatus of this invention. This apparatus comprises a tank 12 for the fluid 17, a container for gelling agent, as 8, and a container for acid, sand or other fracturing fluid agents, 9, and a mixing tank 26 for admixing these agents as desired. The mixing tank 26 is connected to the outlet 53 of pump 13 by a conduit 55 having a venturi, 21. The rate of flow of fluid in conduit 55 may be set (or varied) by fracturing pump 22 which is fed by blender pump 52 and the addition rate of liquid $CO_2$ is correspondingly set in quantities as above discussed to provide the necessary minimum of liquid $CO_2$ for gas-lift discharge of the fracturing fluid and resulting gaseous $CO_2$ from the well. Alternatively, a conventional flow controller 51 is actuated by the flow-through venturi 21 to provide for automatic speed control of pump 11 of known characteristics. The rate of flow of liquid carbon dioxide may also be checked by a conventional flow metering device 38 with sensing element 39 in the discharge conduit 50 of pump 11.

It is within the scope of my invention that, in order to maintain the liquid condition of the carbon dioxide in the pipe 14 and section 18 a cooling indicator, recorder and control subassembly 23 is provided for the conventional fracturing fluid 17. This subassembly comprises a cooling coil compressor 24 connected to coils 25 within the mixing tank 26 and a temperature controller indicator and recorder unit 27. The unit 27 controls the compressor 24 and is actuated by a temperature sensitive element 29 in mixing tank 26. A temperature sensitive element 28 is also located in $CO_2$ container 10 and is connected to controller recorder 27, to enable the operator to set the desired temperature in mixing tank 26 relative thereto. This unit 27 operates to cool the fracturing fluid when low treating pressures are used in order to maintain the mixture of liquid carbon dioxide and fracturing fluid in the liquid condition in formation 15.

Container 10 has an outlet valve 30 which serves to allow evaporation and cooling of the liquid carbon dioxide therein and to pass said cooled gases directly into the mixing tank 26 via conduit 31 while admixing the remaining liquid $CO_2$ in container 10 with fluid 17 from pump 22 as above described. Such valve 30 is used when particularly low temperatures of the liquid $CO_2$ containing fracturing composition in conduit 14 are necessary. A conduit 32 and its valve 33 between container 10 and mixing tank 26 also provides for cooling the fracturing fluid 17 in mixing tank 26 with or without the compressor coil 25 by $CO_2$ evaporation as well as by direct heat transfer of the cold $CO_2$ when additional cooling is required.

Preferably, in normal operating conditions when the fluid 17 is initially at 60 to 75° F. any additional liquid carbon dioxide for temperature control to keep the carbon dioxide in its liquid condition, a requirement for liquid $CO_2$ which is in addition to that required to provide the necessary minimum density $\bar{p}$ as above discussed is admixed with fluid 17 after the pump 13 as at the outlet conduit 53 thereof to provide a temperature of the liquid fracturing mixture in pipe section 18 and formation 15 that, in view of the maximum and minimum treating pressures to be used, will maintain the carbon dioxide in its liquid condition during the fracturing operation. While a temperature indicator and recorder as 34 with sensing element 35 may be connected to or adjacent to the section 18, preferably, for operating convenience, the compressibility of the mixture during the fracturing operation adequately indicates the liquid condition of the carbon dioxide and sufficient cooling of the fracturing fluid is provided as above described to maintain the carbon dioxide in the liquid condition during the fracturing operation.

The fracturing fluid composition according to this invention thus contains a substantial portion of liquid carbon dioxide, usually in the range of an equivalent of 300 to 1500 standard cubic feet of carbon dioxide per barrel of treating fluid for well depths of 2000 to 12,000 feet using conventional 4″ to 7″ I.D. tubing.

The addition to the formation 15 of the fracturing fluid of such composition with the carbon dioxide maintained consistently in the liquid phase as above described is continued until the desired fracturing pressure and volume of liquid fracturing composition has been transmitted into the earth zone or formation 15 to be treated. As in the examples herebelow given, conventional propping agents are also included in the fracturing fluid, e.g. sand, although aluminum oxide pellets, aluminum pellets, walnut shells, may also be used.

Following the admission and penetration of the fracturing fluid into the formation 15 from the well 16 the fracturing fluid composition of liquid carbon dioxide and other fracturing liquid is left in contact with the formation preferably until it may be assumed that the carbon dioxide has reached the formation temperature. This usually requires from 30 minutes to one hour of time. Then the pressure of the $CO_2$ added to the formation as above described is at its maximum for that particular set of conditions. While the down hole temperature of the fluid is estimatable at the same time, it is also true that, the pressure of the carbon dioxide has then ceased to increase and the change of pressure with respect to time then is either substantially zero, i.e., it changes only plus or minus 5 percent within 20 minutes, or, at such time the well head pressure usually begins to decrease. Accordingly, when the $dP/dT$ (where $P=$pressure and $T=$time) is zero or less, i.e., a negative value, then the pressure at the well head discharge valve 36 is relieved by opening of the discharge valve 36 and closing well inlet valve 37. Then the gas-fluid ratio (that which has been determined above by the value of $\bar{p}$) permits that, on release of pressure at the well head, the fracturing fluid is completely cleaned out from the formation and discharged from the well. The clean-out of the fracturing fluid is particularly completed by the action of the carbon dioxide vaporization at the periphery of the zone of maximum penetration of the fracturing fluid in the formation.

Generally, when the partial pressure of carbon dioxide in the formation falls from some higher value to below 1040 p.s.i.a. (the critical pressure of $CO_2$) it also may be assumed that the carbon dioxide has not only completely vaporized but is beginning to pass into the formation: the time for relief of pressure according to this process has then been reached.

In its liquid condition the carbon dioxide has a definite and substantial acid pH value—about 2.9 at 50 atmospheres pressure—and also has a definite solvent action on silicates as are met in the earth formation as well as a known and substantial solvent action on hydrocarbons found in such formations. Such chemical coaction between the liquid carbon dioxide and the aqueous fracturing fluids with which used as well as the liquid condition of the $CO_2$—which provides for full transmission of the fracturing pressure to the treated formation—makes the composition of liquid $CO_2$ and liquid aqueous fracturing fluid particularly effective as a fracturing agent. The further characteristic of the $CO_2$ of expansion following absorption of heat from the formation provides a particularly effective cleaning out of the formation of silts, and clogging hydrocarbon residues by the action as described in U.S. Patent 1,658,305. This action is enhanced by that the amount of liquid carbon dioxide used is such as to provide for a complete discharge of the fracturing fluid from the well.

Well data for the specific examples of this process which follow are given in Table I.

*Table 1*

| Ex | 1 | 2 | 3 | 4 | 5 | 6 |
|---|---|---|---|---|---|---|
| Depth | 2,886 | 2 995 | 2,965 | 2,815 | 2,820 | 2,778 |
| Pipe | 7" | 8⅝ | 2½ | 4½ | 7 | 4½ |
| Perf. depth range | {2,610 2,758} | 1,000 | {2,206 2,854} | {2,519 2,801} | {2 672 2.796} | {2,242 2,772} |
| Hyd., H.P | {1,300 +400} | 1 300 +400 | 650 +400 | 1,300 +400 | 1,300 +400 | 800 +400 |
| Bdn., Pr | 1,500 | 350 | 500 | 1 000 | 1 100 | |
| Max., Tr. P | 800 | 350 | 275 | 650 | 150 | 300 |
| Min., Tr. P | 550 | 150 | | 450 | 75 | 200 |
| Inj. Rate | 32 | 38 | +10 | | 16 | 28.8 |
| $CO_2$ (ton) | 10 | 10 | 5 | 10 | 10 | 10 |
| Bbls. Fluid | 350 | 900 | 180 | 450 | | 445 |
| Shut inT | ¹30 min. | ²1 hr. | 30 | 30' | | 45' |
| Results, BOPD | 60 | | | | 25 | |
| MCFD | | 7,000 | 1,375 | 3,350 | | 2,420 |

¹ Min. ² Hr.

EXAMPLE I

This was essentially an old oil well that had been producing but was depleted. The well was cemented back to the brown dolomite zone thereof and perforated in the brown dolomite, and completed. This well was fractured with a composition consisting essentially of 10,000 gallons of gelled water initially at about 70° F. (water having 20 pounds per thousand gallons of guar gum as gelling agent) fifteen pounds per thousand gallons of fluid loss additive (silica flour, 200 mesh) and liquid $CO_2$ in equivalent of about 500 standard cubic feet of $CO_2$ per barrel. The liquid $CO_2$ was at 275 p.s.i.g. and at 0° F. when fed from tank 10.

The well was broken down with 500 gallons of nonemulsified 15 percent acid.

There was a maximum treating pressure of 800 pounds measured at the well head and a minimum treating pressure of 550 and a breakdown pressure of 1,500 pounds. One hundred barrels of this treated water was pumped as pre-flush. Fracturing was with the previously mentioned fracturing agents, using 30 ball sealers in stages of 5. The job was finished with 100 barrels of flush and a total of 10 tons of liquid $CO_2$ at 275 p.s.i. and 0° F. was pumped throughout the complete job. There was an average injection rate of 32 barrels per minute. The well was opened up after a 30 minute shut-in when $dP/dT$ was approximately zero and blew and then surged for an hour. It was put to pump and started production. 1,300 hydraulic horse power was used at pump 22 for pumping the fracturing fluid and the additional liquid $CO_2$ pumped at 13 had 400 hydraulic horsepower.

The well came at 60 barrels of oil per day and after a five month period it levelled off to 16 barrels of oil per day.

EXAMPLE 2

This well was treated with 300 barrels of 5 percent HCl pre-flush then 250 barrels of 5 percent HCl. These liquors each had very light concentration of gel which amounted to about 10 pounds per thousand gallons. Fifteen thousand pounds of 20 to 40 mesh sand was used in the 250 barrels of frac fluid as propping agent, then the well was flushed with 400 barrels of treated water.

A total of 10 tons of liquid $CO_2$ was added to these treating liquors at the same and uniform rate for each barrel of treating fluid and those fluids (other than liquid $CO_2$) were at 73° F.∓1° F. initially. In this job there was a maximum treating pressure of 350 pounds, and a minimum treating pressure of 150 pounds, and a break down pressure of 350 p.s.i. There was a shut in pressure of 300 p.s.i. at the well head for 30 minutes. The injection rate was 38 barrels per minute. There was one fracturing pump 22 of only 400 H.P. and a 400 H.P. pump for item 13. The well blew back, cleaned up, and on the 4 point test (T.R.R.C. test) the well made seven million cubic feet per day.

EXAMPLE 3

This well in a dolomite formation had been previously fractured with 30,000 gallons of gelled water and 60,000 pounds of sand by one of our competitors, but the well would not produce satisfactorily. The operators went in according to this process with a fracturing composition consisting of 7,500 gallons of water with 15% acid all initially at 75° F. and five tons of liquid $CO_2$ initially at 275 p.s.i.g. and 0° F. and 75 balls as ball sealers. During the course of the treatment the maximum treating pressure was 275 pounds; break down pressure was 500 pounds; average injection rate was 10 barrels per minute down the 2½ inch tubing. The well was shut in for 30 minutes and when $dP/dT$ was 0 it was allowed to blow back. The well kicked off, cleaned up, and blew dry without any swabbing. The well was then potentialed for a million-three hundred-and seventy thousand cubic feet per day of gas.

EXAMPLE 4

This well had depleted and had stopped flowing. The well was cleaned out to its original total depth of 2,815 feet. 4½" pipe was then run in and cemented in place. The well was then treated with 18,500 gallons of 5 percent HCl of which 12,000 gallons was used as a fracturing fluid containing 18,000 pounds of sand and 10 tons of liquid $CO_2$ added as above described in Examples 1 and 2. The shut in pressure was held until the pressure began to decrease and then was released. It then provided a production of 3,550,000 cubic feet of gas per day as indicated on a 30 minute blow down test.

EXAMPLE 5

This well was an offset well to the well of Example 1. It was fractured with 10,000 gallons of water having 20 pounds of gel and 10 pounds of fluid loss additives per thousand gallons of water initially at 70° F. and 30,000 pounds of 20–40 mesh sand as propping agent. The maximum treating pressure (measured at well head) was 150 pounds; the minimum treating pressure of 75; the breakdown pressure was 1,100 pounds. Ten tons liquid $CO_2$ were pumped in the liquid used as pre flush at a uniform rate relative to such liquid. No $CO_2$ was pumped in the post flush; there were 115 barrels of post flush. As no $CO_2$ was put into the final flush when the well was opened up and immediately after frac it was on a vacuum. This well came back in at 25 barrels per day and levelled at 10 barrels of oil per day.

EXAMPLE 6

This was an old gas well in brown dolomite formation. The well was cleaned out, and drilled to 2900 feet. A 4½" tubing was run to 2778 feet, the well was treated with a composition consisting of 12,000 gallons of 5 percent gelled acid containing 18,000 pounds of sand and 200 pounds of gelling agent and initially at 70° F. all 1,500 gallons of 5% acid were used for break down and 150 barrels of pre-flush were used. Ten tons of liquid $CO_2$ initially at 275 p.s.i.g. and 0° F. were added to the above-mentioned liquids at the same rate and at a uniform rate for each barrel of such treating fluids. The treatment had a maximum treating pressure of 300 p.s.i.g. and a minimum treating pressure of 200 p.s.i.g. at the well head, where all such pressures heretofore mentioned were also measured and an injection rate of 28.8 barrels per minute. It had a 45-minute shut-in pressure of 250 p.s.i.g. measured at the well head. After decrease thereof to 200 p.s.i., the well was opened up, blew back, cleaned up, and produced 2,420,000 cubic feet of gas per day.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. Process of treating formation containing a deposit chosen from the group consisting of oil and gas which process comprises the steps of
    (a) forming a liquid-liquid mixture comprising liquid carbon dioxide and water
    (b) injecting said mixture at such pressure and below a temperature sufficient to maintain said carbon dioxide in a liquid state into a well which penetrates from the surface into an earth formation containing deposits chosen from the group consisting of oil and gas, and
    (c) fracturing said formation with said mixture,
    (d) and then releasing the pressure on said formation and discharging a mixture comprising gaseous carbon dioxide, substantially all of the water provided in said liquid-liquid mixture, and well debris from said earth formation into the well and from said well at the surface, and
wherein the amount of liquid carbon dioxide admixed with the water provides a $CO_2$ gas-water ratio, measured at 14.7 p.s.i.a. and 80° F., of from 300 to 1500 cubic feet of gas per 42 gallon barrel of water.

2. Process of treating an underground formation containing a deposit chosen from the group consisting of oil and gas which process comprises the steps of
    (a) forming a liquid-liquid mixture comprising liquid carbon dioxide and water
    (b) injecting said mixture at such pressure and below a temperature sufficient to maintain said carbon dioxide in a liquid state into a well which penetrates from the surface into an earth formation containing deposits chosen from the group consisting of oil and gas, and
    (c) fracturing said formation with said mixture,
    (d) maintaining said mixture in said formation until the partial pressure of carbon dioxide of said mixture is less than the critical pressure of carbon dioxide at the ambient temperature of said formation; and then
    (e) releasing the pressure on said formation and discharging a mixture comprising gaseous carbon dioxide, substantially all of the water provided in said liquid-liquid mixture, and well debris from said earth formation into the well and from said well at the surface, and
wherein the amount of liquid carbon dioxide admixed with the water provides a gas-liquid ratio such that the integrated density of the mixture in said well during flowing of said mixture as discharge from said well is less than $\bar{p}$, $\bar{p}$ being defined as follows:

$$\bar{p} = 144 \frac{\Delta p}{\Delta H} - \frac{fQ^2M^2}{7.413 \times p \times D^5 \times 10^{10}}$$

where
$\Delta p$ = pressure difference (in p.s.i.) between the formation flowing pressure and the surface flowing pressure,
$\Delta h$ = difference in height (in ft.) between the formation and the surface,
$\bar{p}$ = integrated average density (in lb./cu. ft.) of the two-phase mixture between the two points,
$M$ = total mass (in lb. of the gas and fluid associated with 1 bbl. of fracturing fluid),
$D$ = inside diameter (in ft.) of the pipe, and
$f$ = dimensionless factor used as the correlating function for total energy loss due to irreversibilities of the fluid in flow,
and wherein the value of $f$ varies as follows:

| $\frac{QM}{D} \times 10^{-6}$ | $f$ |
|---|---|
| 0.3 | 0.8 |
| 0.5 | 0.15 |
| 1.0 | 0.03 |
| 2.0 | 0.01 |
| 3.0 | 0.006 |
| 4.5 | 0.0055 |
| 6.0 | 0.005 |

References Cited by the Examiner

UNITED STATES PATENTS

| 2,884,067 | 4/59 | Marken | 166—75 |
| 2,964,109 | 12/60 | Martin | 166—43 |
| 2,999,812 | 9/61 | Krahler | 252—8.55 |
| 3,063,499 | 11/62 | Allen | 166—42.1 |
| 3,075,918 | 1/63 | Holm | 252—8.55 |
| 3,090,439 | 5/63 | Copland | 166—75 |
| 3,108,636 | 10/63 | Peterson | 166—42.1 |

CHARLES E. O'CONNELL, *Primary Examiner.*